(12) United States Patent (10) Patent No.: US 8,374,081 B2
Farrugia et al. (45) Date of Patent: Feb. 12, 2013

(54) CONTROLLING SUBSCRIBER USAGE IN A TELECOMMUNICATIONS NETWORK

(75) Inventors: Maria Farrugia, Guildford (GB); Marco Stura, Rueglio (IT); Maurizio Monti, Settala (IT)

(73) Assignee: Vodafone Group PLC, Newbury, Berkshire (GB)

( * ) Notice: Subject to any disclaimer, the term of this patent is extended or adjusted under 35 U.S.C. 154(b) by 96 days.

(21) Appl. No.: 12/776,685

(22) Filed: May 10, 2010

(65) Prior Publication Data

US 2011/0211465 A1 Sep. 1, 2011

(30) Foreign Application Priority Data

May 8, 2009 (GB) .................................. 0907946.8

(51) Int. Cl.
*G01R 31/08* (2006.01)
(52) U.S. Cl. ........................................................ 370/229
(58) Field of Classification Search ........... 370/229–235
See application file for complete search history.

(56) References Cited

U.S. PATENT DOCUMENTS

| | | | | |
|---|---|---|---|---|
| 4,979,118 | A * | 12/1990 | Kheradpir | 701/117 |
| 7,142,507 | B1 * | 11/2006 | Kurimoto et al. | 370/229 |
| 7,145,438 | B2 * | 12/2006 | Flen et al. | 714/776 |
| 7,158,481 | B1 * | 1/2007 | Saari | 370/235 |
| 7,680,481 | B2 * | 3/2010 | Ejzak et al. | 455/406 |
| 2002/0046277 | A1 | 4/2002 | Barna et al. | |
| 2008/0037420 | A1 * | 2/2008 | Tang | 370/229 |
| 2008/0049615 | A1 * | 2/2008 | Bugenhagen | 370/230.1 |
| 2008/0276000 | A1 | 11/2008 | Motte et al. | |
| 2010/0271947 | A1 * | 10/2010 | Abdelal et al. | 370/235 |

OTHER PUBLICATIONS

Pat R. Calhoun Black Storm Networks John Loughney Nokia Erik Guttman Sun Microsystems et al; "Diameter Base Protocol; draft-ietf-aaa-diameter-17.txt" IETF Standard Working Draft; Internet Engineering Task Force, IETF, CH, vol. aaa, No. 17, Dec. 1, 2002, XP015001289 ISSN: 0000-0004 *abstract* *9. Accounting; p. 116—p. 125*.

(Continued)

*Primary Examiner* — Fang Ng
(74) *Attorney, Agent, or Firm* — B. Aaron Schulman, Esq.; Nicholas B. Trenkle, Esq.; Stites & Harbison, PLLC (57) ABSTRACT

In a telecommunications network including a gateway network element in communication with a control system and a user device, a system and method of controlling a data consumption rate of the user device including: a first control system node periodically transmitting a command to a second control system node, the message including information relating to a user's data usage, received from the gateway network node; in response to each command, the second control system node transmitting a reply message to the first control system node; controlling the transmission of the periodic commands according to a variable time interval; and the second control system node using the data usage information received in the periodic reply messages to control the data consumption of the user device. Preferably the control system conforms to a 3GPP Policy Charging Control Architecture and the first node is a PCEF and the second node is a PCRF. It is also preferable that the command is a DIAMETER protocol Accounting Request (ACR) command and the reply message is a DIAMETER protocol Accounting Answer (ACA) message.

17 Claims, 4 Drawing Sheets

OTHER PUBLICATIONS

"Digital cellular telecommunications system (Phase 2+); Universal Mobile Telecommunications System (UMTS); LTE; Policy and charging control architecture (3GPP TS 23.203 version 8.5.0. Release 8); ETSI TS 123 203" ETSI Standard, European Telecommunications Standards Institute (ETSI), Sophia Antipolis Cedex, France, vol. 3-SA2, No. v8.5.0, Mar. 1, 2009, XP014043879 *5.1 Reference Architecture; p. 16-p. 18; figures 5.1.1, 5.1.2*.

European Search Report for EP 10 162 395.7.
Rigney C. "Radius Accounting", Internet Citation, Jun. 2000, XP002205198, Retrieved from the Internet: URL: www.ietf.org/rfc/rfc2866.txt.

* cited by examiner

CONTROLLING SUBSCRIBER USAGE IN A TELECOMMUNICATIONS NETWORK

SUMMARY OF THE INVENTION

The present invention relates to a communications network and a method of controlling data transfer in the network, typically in real time or near real-time. More particularly the present invention relates to a method of, and arrangement for, monitoring, managing and/or controlling a subscriber's usage of network resources, particularly a volumetric data consumption or a data consumption rate in a telecommunications network.

BACKGROUND

Mobile communications have advanced markedly from its earliest beginnings of providing users with a means of voice communication wirelessly from any location within range of a base station. This has developed into being able to provide mobile connectivity for voice and data to any suitable mobile device, including mobile phones, PDAs and PCs with a suitable connectivity card. Mobile services can be provided on various networks, including GSM, UMTS, HSxPA, WiMaX and the currently under-development LTE/SAE (Long Term Evolution/System Architecture Evolution) network.

The third generation partnership project (3GPP) has additionally defined a new concept for transporting voice, data and other telecommunication services, known as IMS (IP-based Multimedia Subsystem). The IMS is a set of core network servers sitting behind the GGSN (Gateway GPRS Support Node) in the packet switched domain. With IMS, users are no longer restricted to a separate voice call or data session. Sessions can be established between devices that allow a variety of communication types to be used and media to be exchanged. For example, the IMS architecture can support voice, video, instant messaging, "presence" (a user's availability for contact), location-based services, email and internet access. Further communication types are likely to be added in the future.

This increase in service availability with improved network configurations has also corresponded to an increase in bandwidth availability, but bandwidth is of course not limitless. Therefore, techniques need to be in place to ensure that users do not unduly abuse the bandwidth available to them, and in this regard a fair usage policy is generally implemented. This has particularly become an issue with the rapid adoption of flat rate data tariffs, making data traffic management and control an important requirement for network operators.

Under fair usage policies, a user's bandwidth usage is monitored, and if it is found to be excessive over a period of time, particularly to the point of impacting other users, then the user's bandwidth availability/speed will be throttled/restricted. For instance, a transfer rate of 60 GB per month might currently be considered to be excessive for a user on a "light" data usage tariff.

Therefore, there needs to be a mechanism for being able to monitor a user's data consumption rate and control their usage, preferably in near real time.

The ability to monitor a user's data consumption rate in near real time is also useful from a user point of view, in being able to provide a mechanism to prevent "bill shock". More specifically, the improved access to a multitude of wireless services and the ability to download larger amounts of data over telecommunications networks, also results in the possibility of unexpectedly high bills being tallied up. This is particularly the case where users seek to download data whilst not in their home network (e.g. whilst roaming), or where they are not on unlimited usage packages.

The ability to do so in near real time, would allow a degree of control to be applied to problematic users, or users about to place themselves in problematic situations, which can be applied immediately once an unacceptable event/threshold is met or about to be met, thereby preventing or at least minimising any adverse consequences.

SUMMARY OF THE INVENTION

According to a first aspect, the present invention provides, in a telecommunications network including a gateway network element in communication with an accounting system and a user device, a method of controlling a data consumption rate of the user device including:

transmitting a sequence of commands from a first control system node to a second control system node, each of the commands including usage information relating to data usage associated with the user device, the usage information being received from the gateway network element;

in response to at least one of said commands, transmitting a corresponding reply message from the second control system node to the first control system node, the or each reply message including control information for controlling the transmission of the subsequent commands according to a variable time interval; and the second control system node using the data usage information within at least one of the received commands to control the data consumption rate of the user device.

According to a second aspect, the present invention provides a control system configured for use in a telecommunications network, the control system including a first node and a second node: the first node being configured to transmit a sequence of commands to a second node, each of the commands including usage information relating to data usage associated with a user device; the second node being configured to transmit corresponding reply messages to the first node in response to at least one of said commands, the or each reply message including control information; the second node further including a controller configured to use the control information to control the transmission of the subsequent commands according to a variable time interval; and the second node using the data usage information within at least one of the received commands to control the data consumption rate of the user device.

Preferably the time interval periodicity for the transmission of commands and/or reply messages is dynamically determined. For instance, the length of the time intervals may be decreased as the user device's data usage approaches a threshold. In this way, it becomes possible to better manage the balance between controlling the user's usage and minimising excess system signalling.

Ideally these aspects of the invention are implemented using a Diameter based accounting mechanism used in conjunction with a Policy and Charging Control (PCC) system or an AAA server. It is also preferable that the first node is a PCEF or a NASS or any Access Gateway (referred to hereafter as Gateway) and the second node is a PCRF or a AAA server (referred to hereafter as Controller), and the command is a DIAMETER protocol Accounting Request (ACR) command and the reply message is a DIAMETER protocol Accounting Answer (ACA) message.

Advantageously these aspects of the invention enable near real time control to be applied to a user's network data usage without substantial hardware changes being required, and also without requiring a change to the 3GPP and IETF standards. Therefore, the mechanisms according to these aspects of the invention can be easily introduced into existing implementations.

The mechanism according to these aspects of the invention enables a variable time interval to be provided for reporting the data that can change dynamically based on the near real-time volume consumption of the subscriber. In this way, for instance, a more accurate mechanism can be attained for signalling in near real time when a data volume limit for the subscriber during a particular billing cycle has been reached.

In addition to allowing a fair usage policy to be implemented, these aspects of the invention can also be used to prevent the user receiving "bill shock", in that it can limit the user's network usage once a threshold has been reached. Advantageously this assists with enhancing user confidence in being able to make use of data download/upload services without any unexpected adverse monetary consequences.

Other aspects of the invention are defined in the attached set of claims.

BRIEF DESCRIPTION OF THE DRAWINGS

Embodiments of the invention will now be described with reference to the accompanying drawings, in which.

DETAILED DESCRIPTION

Figure 1:
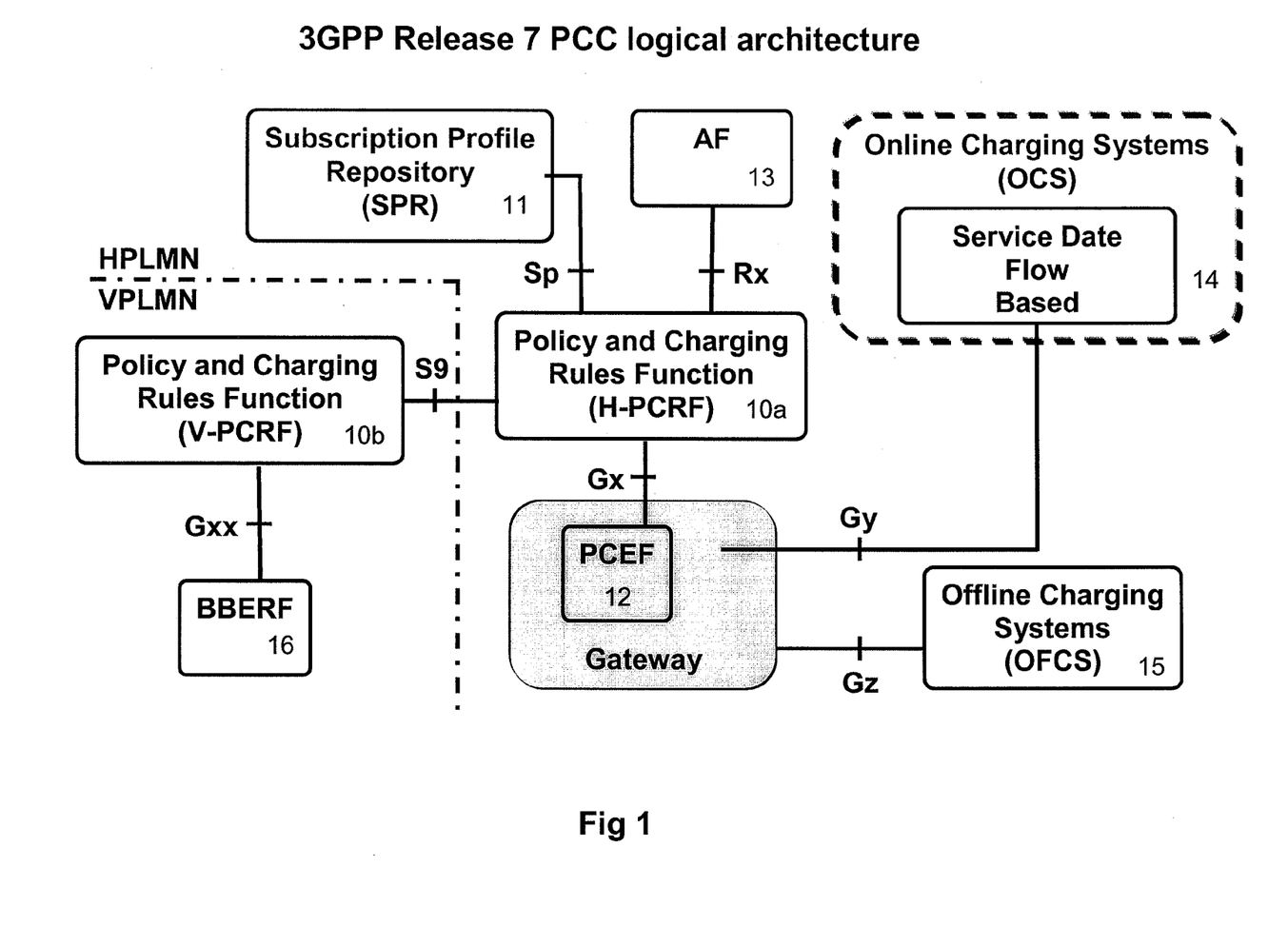
FIG. 1 is a diagrammatic drawing of the logical architecture of the Policy and Charging Control (PCC) components according to 3GPP Release 8, being an arrangement in relation to which embodiments of the invention may be utilised.

Key elements of a 3GPP Release 8 Policy and Charging Control (PCC) Architecture, useful in explaining the embodiments of the invention, are illustrated in FIG. 1. The architecture has been designed so that a common policy and charging mechanism can be provided regardless of the access networks UEs are using to communicate. This architecture is suitable for use with the Diameter based accounting mechanism specified in RFC 3588.

Prior to Diameter, the Radius protocol (Remote Access Dial In User Services) was used to provide user authentication, authorization and accounting (AAA) services. Over time, with the growth of the Internet and the introduction of new access technologies, including wireless, DSL, Mobile IP, Ethernet and network access servers have increased in complexity and density, putting new demands on AAA protocols. Inherent shortcomings of the Radius protocol, however, have limited its ability to adapt to the ever-increasing range of network services and methods of providing those services; hence the development of Diameter.

The Diameter protocol, as specified in RFC 3588, was developed to replace Radius in AAA infrastructure, which better supports roaming and access to IP networks, such as IMS. This computer network protocol is an open standard, and so is available to application developers in many markets.

The 3GPP Release 8 PCC system, as shown in FIG. 1, is configured to operate using the Diameter protocol.

Central to the FIG. 1 PCC architecture is the Policy and Charging Rules Function (PCRF) 10a, 10b. This component typically makes admission decisions according to its resource rules. It also resolves conflict between different rules and the required Quality of Service (QoS) level, particularly in view of the current traffic conditions. This element supersedes the Policy Decision Function (PDF) that was described in previous releases of this architecture.

The architecture in FIG. 1 is configured for roaming, and so the PCRF has been split into two elements, the Home-PCRF (H-PCRF) 10a for providing rules functionality to the Home Public Land Mobile Network (HPLMN) and the Visited-PCRF (V-PCRF) 10b for providing rules functionality to the Visited Public Land Mobile Network (VPLMN). Of course, where roaming is not accounted for, this divide need not be made.

The PCRF 10a, 10b is associated with a Subscription Profile Repository (SPR) 11 which provides subscriber-specific data to the PCRF, such as an authorised cumulative, guaranteed bandwidth QoS, per subscriber.

The PCRF 10a, 10b is also associated with an Application Function (AF) 13 which provides the service logic and communicates the application level session information to PCRF such as classifiers identifying service flows, on which policy control and differentiated charging is required. The AF 13 may be an application server provided by a third party. In IMS, the AF functionality may be provided by the P-CSCF (Proxy Call Session Control Function).

The PCRF 10a, 10b is connected to the Policy and Charging Enforcement Function (PCEF) 12. The PCEF manages media flows according to the PCC rules and QoS settings. The policy rules typically pertain to access authorisation and allocation of the necessary bandwidth and resources in order to provide a service. The rules are provided to the PCEF from the PCRF across the Gx interface. These rules may be pushed by the PCRF or dynamically pulled by the PCEF when a session request is initiated. The PCEF typically has the power to terminate a session request if the QoS attributes cannot be satisfied. The PCEF may also terminate a media flow as a result of a PCC rule change from the PCRF that cannot be satisfied (e.g. an unobtainable QoS). The PCEF is typically located at a Gateway node, such as the GGSN in a GSM/UMTS network, the PDG (Packet Data Gateway) in a WLAN or in the PDN-GW (Packet Data Network Gate Way) of LTE/SAE.

The PCEF 12 is also associated with an Online Charging system (OCS) 14 across the Gy interface. The OCS 14 allows online credit control in order to provide network service providers with the ability to charge their customers for pre-paid services before provisioning the service (see 3GPP TS 32.296). To do so, the OCS 14 is configured to directly interact with a user's account in order to check if credit is available, reserve credit where available, deduct from the reserved credit when the service is completed and refund any reserved credit not used.

Similarly, the PCEF 12 is associated with an Offline Charging System (OFCS) 15 across the Gz interface. The Gz interface enables transport of service data flow based offline charging information. Offline charging is applied to users who pay for their services periodically.

The PCRF 10a, 10b is also associated with a Bearer Binding and Event Reporting Function (BBERF) 16. In FIG. 1, the BBERF 16 is shown as being associated with the V-PCRF 10*b*, but this is not essential, and it may alternatively be associated with the H-PCRF 10*a*. The PCC architecture works on a service data flow level, and the binding mechanism is the procedure that associates a service data flow to the bearer (e.g. Internet Protocol Connectivity Access Networks (IP-CAN) such as GPRS, WLAN and Fixed Broadband) deemed to transport the service data flow.

It is with this background in mind, that a first embodiment of the invention will be described. As indicated earlier, it is desirable to implement a fair usage policy in near real time. Fair usage policies provide service providers with the option of restricting a particular customer's usage, where that customer's usage has been excessive over a period of time, particularly to the point of adversely impacting other users. A subscriber's near real time, data volume consumption could be used to implement such a policy. For instance, the subscriber's data volume consumption could be used as a trigger to throttle/restrict a flat rate subscriber to a lower bit rate, as soon as a certain data usage limit has been exceeded.

The PCC architecture of FIG. 1 within the network operator domain is capable of monitoring data consumption per subscriber and of carrying out policy enforcements through the PCEF 12 as instructed by the PCRF 10. However, in order to take the right policy decision, the PCRF 10 requires subscribers' information in near real time from the PCEF 12 (via the Gx interface). This interface, however, does not support real time reporting, and to include such a capability in its operating standards would require a significant change to the current interface specification. Further, from a practical viewpoint, the time period before such a capability could be approved, standardised and implemented by the 3GPP committees would be lengthy.

The OFCS 15 is currently capable of reporting volume consumption to the PCRF 10, but not in real time or near real time. The OFCS is therefore not able to provide the information with sufficient timing accuracy to enforce a timely fair usage policy decision. Timing is critical since, as indicated above, the delay in reporting any excessive usage of data by one subscriber can impact negatively on other mobile data subscribers sharing the same resources.

The OCS 14 could also be used to report the volume consumption. However if the OCS 14 was used to report volume consumption information to the PCRF, an additional interface between the OCS and the PCRF would be required in order to signal that a volume consumption limit has been reached (the same would apply for the OFCS as well). The addition of a new interface would be a considerable alteration to the PCC architecture. Further, in some circumstances the OCS 14 might not be available, for example if all the subscribers are post-paid users or in a fixed access architecture where online charging is typically not required.

The present embodiment of the invention instead provides a simpler approach for supporting an accurate near real time volume consumption report that is easier to introduce than a change in the existing 3GPP standard specifications.

According to the present embodiment of the invention, rather than introducing new signalling requirements into the standards in order to implement real-time subscriber usage reporting, use is made of existing commands that are transmitted between the Controller and Gateway. In particular, Accounting Request (ACR) and Accounting Answer (ACA) as defined in the Diameter standard for transferring accounting information between a client and the Diameter charging server, may be utilised to transfer subscriber usage information in near real time.

Advantageously, this embodiment of the invention does not require any adaptation to the standards, and in particular does not require any changes to be made to the PCC architecture. The embodiment can be implemented with minor signalling changes, and accordingly can be implemented in existing systems without hardware adaptations being required.

Figure 2:
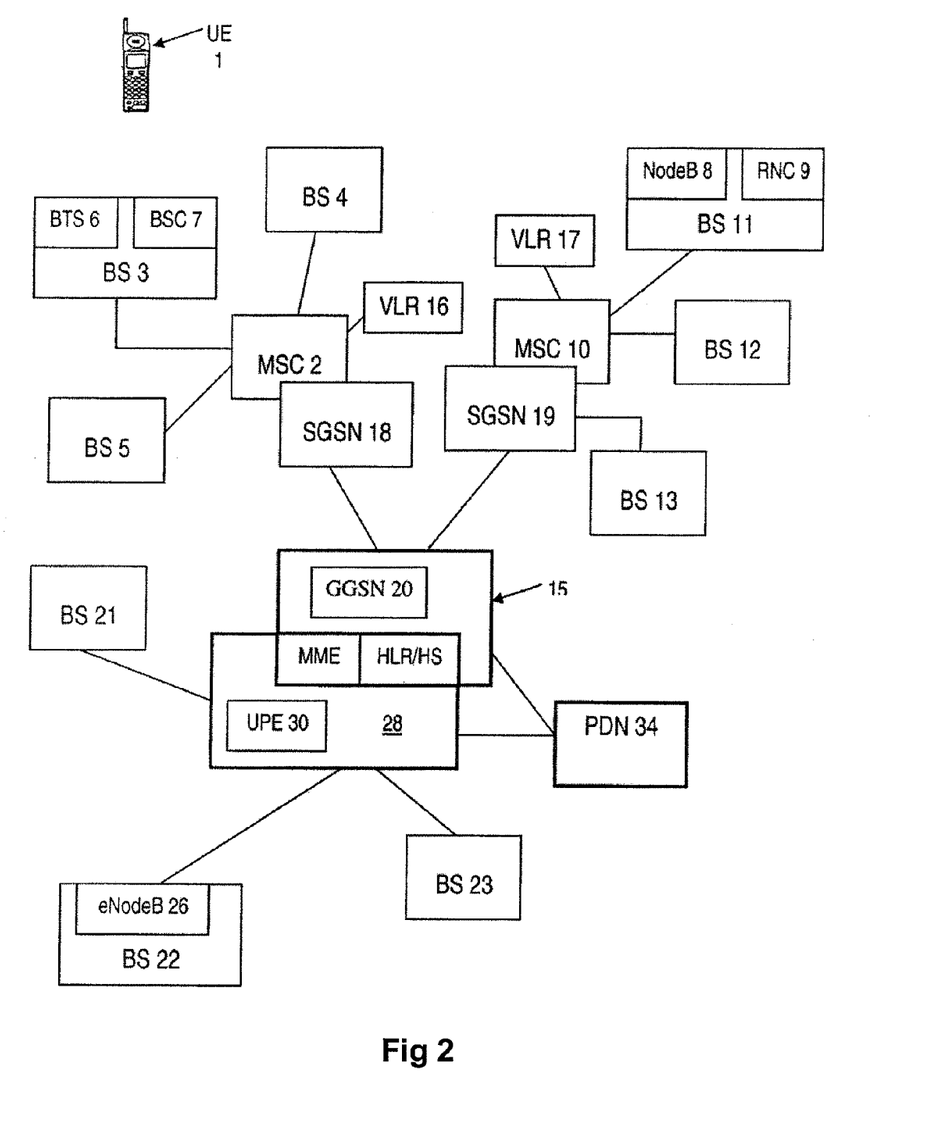
FIG. 2 is a diagrammatic drawing of key elements of a mobile telecommunications network for use in explaining the interrelationship between the operation of such a network, and the embodiments of the present invention.

To illustrate this in more detail, an example will be provided of a UE establishing a network data communication by first establishing a PDP session. With reference to FIG. 2, the key elements of a typical mobile telecommunications network are illustrated.

The subscriber's mobile device (UE) is shown at 1, which may be any suitable portable device, including a handheld mobile telephone, a personal digital assistant (PDA) or a laptop computer equipped with a network connectivity datacard.

The UE communicates with the core network via the base stations (e.g. BS3, BS4, BS5). A GSM mobile telecommunications network includes a base transceiver station (BTS) 6 and a base station controller (BSC) 7. A BSC may control more than one BTS. The BTSs and BSCs comprise the radio access network.

A UMTS mobile telecommunications network comprises a nodeB 8 and a radio network controller (RNC) 9. An RNC may control more than one node B. The node B's and RNC's comprise the radio access network.

In the proposed LTE/SAE mobile telecommunications network, an eNode B 26 combines the RNC and Node B functionalities. The eNode Bs are arranged in groups and each group of eNode B is likely to be controlled by a Mobility Management Entity (MME) and an S-/P-GW.

Conventionally, in a GSM/UMTS network, the base stations are arranged in groups and each group of base stations is controlled by one serving GPRS support node (SGSN), such as SGSN 18 for base stations 3, 4 and 5.

The SGSNs 18 and 19 are provided to support communications in the packet switched domain—such as GPRS data transmissions. The SGSNs 18 and 19 are in turn connected to a gateway GPRS support node (GGSN) 20, which provides a gateway to packet data networks (PDN) 34, such as the Internet, in order to provide mobile broadband services.

Corresponding Mobile Switching Centres (MSCs) 2 and 10 support communications in the circuit switched domain—typically voice calls. The MSCs function in an analogous way to the SGSNs.

When UE 1 seeks to initiate a data service, which can amount to anything from sending an SMS or email, accessing the Internet to downloading a sound/video file, a service request will be transmitted from the UE 1 to its serving base station, for instance BS 4. After authenticating the UE, the BS 4 will forward the data service request to SGSN 18, which in turn forwards the request to its GGSN 20. The GGSN serves as an interface between the radio networks and the IP networks 34. In this regard, the GGSN establishes a Packet Data Protocol (PDP) session with the appropriate IP network, and thereafter converts the GPRS packets received from the SGSN into the appropriate PDP format (e.g. IP or X.25) and vice versa.

Once the data session is established, during the lifetime of the PDP session, the Diameter based account system, such as illustrated in FIG. 1, operates in parallel, communicating with a gateway node to obtain information on service data flows and traffic. In this regard, it is typically the gateway node (e.g. a Network Access Server (NAS), the GGSN or PDN-GW) that detects service data flows and implements traffic collection.

According to the Diameter standard specified in RFC3588, a generic mechanism is specified whereby accounting record requests are sent from a Diameter server to a Diameter client using Accounting Request (ACR) commands. Replies are then sent back to the Diameter server using Accounting Answer (ACA) commands. The ACR and ACA commands are normally used for collecting information on resource usage for the purpose of capacity planning, auditing, billing or cost allocation.

The message format of the ACA and ACR commands according to RFC3588 is:

```
<ACA> ::= < Diameter Header: 271, PXY >
            < Session-Id >
            { Result-Code }
            { Origin-Host }
            { Origin-Realm }
            { Accounting-Record-Type }
            { Accounting-Record-Number }
            [ Acct-Application-Id ]
            [ Vendor-Specific-Application-Id ]
            [ User-Name ]
            [ Accounting-Sub-Session-Id ]
            [ Acct-Session-Id ]
            [ Acct-Multi-Session-Id ]
            [ Error-Reporting-Host ]
            [ Acct-Interim-Interval ]
            [ Accounting-Realtime-Required ]
            [ Origin-State-Id ]
            [ Event-Timestamp ]
            * [ Proxy-Info ]
            * [ AVP ]
<ACR> ::= < Diameter Header: 271, REQ, PXY >
            < Session-Id >
            { Origin-Host }
            { Origin-Realm }
            { Destination-Realm }
            { Accounting-Record-Type }
            { Accounting-Record-Number }
            [ Acct-Application-Id ]
            [ Vendor-Specific-Application-Id ]
            [ User-Name ]
            [ Accounting-Sub-Session-Id ]
            [ Acct-Session-Id ]
            [ Acct-Multi-Session-Id ]
            [ Acct-Interim-Interval ]
            [ Accounting-Realtime-Required ]
            [ Origin-State-Id ]
            [ Event-Timestamp ]
            * [ Proxy-Info ]
            * [ Route-Record ]
            * [ AVP ]
```

Support for these commands is mandated in all Diameter base compliant implementations and hence by all PCRF/PCEF.

Therefore, according to an embodiment of the invention, these commands can be utilised by the PCC or AAA systems for the implementation of a fair usage policy and/or a user charging limit in near real time. For instance, where the user has a maximum data volume usage, the Controller (e.g. PCRF) can use the regular reports to monitor the user's usage, and implement a timely policy decision close to when the data volume threshold for the subscriber is reached.

More specifically, the Gateway (e.g. PCEF) can send an ACR command to the Controller, which will reply with an ACA command acknowledging the receipt of the request. The information can be continually fed from the Gateway node (e.g. the PCEF), and stored in relation to the Controller (e.g. PCRF) which can control the time interval of when the next ACR has to be sent.

The user consumption information may be placed in the appropriate AVP field.

In order to achieve near real time monitoring of a PDP session for the lifetime of the PDP session, ACR/ACA messages need to be reported at regular periodic intervals, with the intervals short enough to enable a timely policy decision to be taken by the Controller (e.g. PCRF). There is of course a balance to be reached with the frequency of the reports, because if the reports are too frequent, they can impact the performance of the system. The interval should therefore be set to a value determined to be suitable.

A set periodic interval, however can be difficult to suitably define, particularly since the suitability may well depend upon the user's data consumption.

Therefore, according to an alternative embodiment of the invention, an algorithm can be used, which provides a mechanism for calculating an optimal report interval to be used by the Gateway (e.g. PCEF) at any given point in time. In this further embodiment, the proposed mechanism is based on the volume consumption of the subscriber, in near real time:

$$\text{Acct\_interval} = \text{Maximum}(((\text{Threshold} - \text{Volume\_usage})/\text{Max\_bitrate} - \text{Safeguard}), \text{Min\_reporting\_interval}) \qquad \text{Eq. (1)}$$

Where:
Acct_interval is the time interval used by the Gateway (e.g. PCEF) to send ACR messages and sent by the Controller (e.g. PCRF) in the ACA message as described in the Diameter Base protocol RFC 3588;
Threshold is the data volume limit set for the subscriber;
Volume_usage is the cumulative data volume consumption (uplink+downlink);
Max_bitrate is the maximum authorized bit rate of the data (uplink+downlink) by the subscriber;
Safeguard is a value, typically in seconds, that can be used to make up for the delay in the transmission of ACR and ACA commands over the interface;
Min_reporting_interval is the minimum allowed interval set to avoid overloading the system. The value of the Min_reporting_interval needs to be sufficiently small (e.g. 10 seconds) so as to ensure an accurate reporting of the data volume consumption by the subscriber. However, care needs to be taken to avoid overloading the system (Controller, Gateway and interfaces) which could result in a performance down grade for other running tasks.

Advantageously, by utilising this algorithm, the reporting interval can be changed dynamically, based on the volumetric data consumption of the subscriber, determined in near real time. For instance, where the subscriber's data usage is found to be low, and well below a usage threshold for the subscriber, the regularity of reports can be relatively less frequent. However, if the user is consuming data at a high rate (e.g. downloading a film wirelessly) and approaching their usage threshold, then reports can be made more frequently. In other words, as the data consumption of the subscriber approaches a defined threshold, the frequency of the reporting increases. This enables the Controller to make a timely policy decision, for example to throttle the bit rate to a lower rate.

Figure 3:
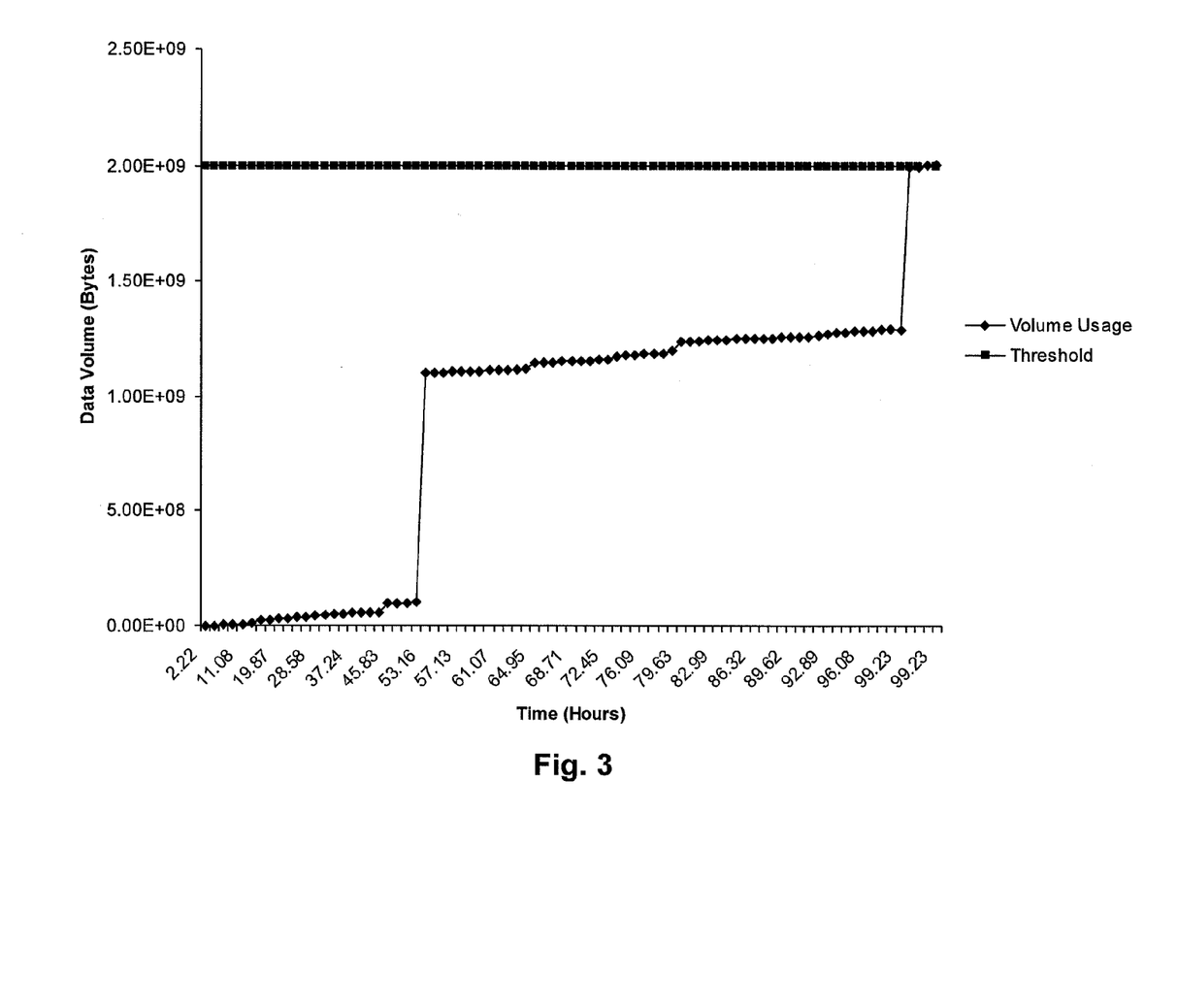
FIG. 3 illustrates a graph of data volume to time in a simulation of dynamic accounting according to an embodiment of the present invention.
Figure 4:
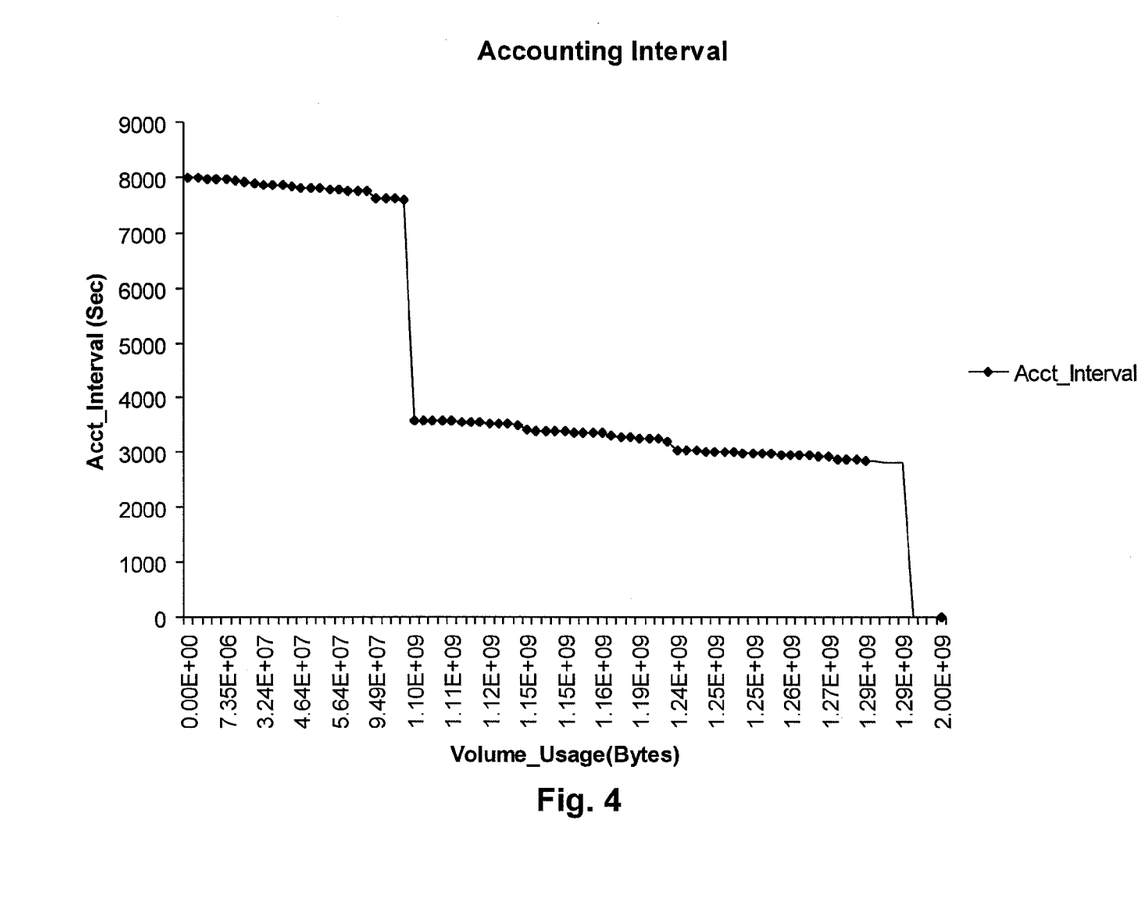
FIG. 4 illustrates a graph of the parameter "Acct_Interval" to Volume usage in the simulation of dynamic accounting according to an embodiment of the present invention. The graph is based on the same simulation as FIG. 3.

The usage of this dynamic monitoring is illustrated graphically in FIGS. 3 and 4. In this simulation example, the proposed formula was utilised to determine the account interval:

$$\text{Acct\_Interval} = \text{Maximum}(\text{Reporting\_Interval}', \text{Min\_reporting\_interval}) \qquad \text{Eq. (2)}$$

where $$\text{Reporting Interval}' = \text{ROUND}(((\text{Threshold} - \text{Volume\_usage})/\text{Max\_bitrate}) - \text{Safeguard}; 0) \qquad \text{Eq. (3)}$$

The rounding is required because it is necessary for the accounting interval to return an integer value. For example, in DIAMETER, the accounting interval is typically of type Unsigned 32, which requires integer values.

In the example, the following inputs are used:
Threshold: set to 2 GB (gigabytes)
Volume_usage: as per the measured aggregated number of bits consumed by the user
Max_bitrate: set to 2 Mbps (Megabits per second)
Safeguard: set to 2 seconds
Min_Reporting_interval: set to 4 seconds (i.e. a value considered to be a good compromise between the load created on the interface and the acceptable error in exceeding the threshold).

Further, in the example, a random generator was utilised to emulate the user behaviour generating traffic. FIGS. 3 and 4 illustrate the results of the simulation.

Firstly referring to FIG. 3, the 2 GB threshold is highlighted and the graph of data volume to time starts at a time of 2.22 hours, where the user's volumetric usage was at zero, or at least negligible. Over the next couple of days (i.e. to 53.16 hours) the user consumes a small quantity of data, of the order of 94.9 MB. Over this time period the Accounting Interval has been maintained in the region of 7700-8000 seconds (see FIG. 4). In other words, at time 2.22 hours, with zero consumption, the Accounting Interval was 8000 seconds, and just before time 53.16 hours, where the consumption had reached 94.9 MB, the Accounting Interval had increased in frequency slightly, so that each command is sent at approximately 7700 second intervals.

At time 53.16 hours, the user has a sharp consumption increase, from 94.9 MB to 1.1 GB. In view of this large increase in consumption, the Accounting Interval has been dynamically decreased to an interval of approximately 3600 seconds (i.e. an increase in frequency). Over the next couple of days (i.e. to 99.23 hours) the user's consumption gradually increases from 1.11 GB to 1.29 GB and the Accounting Interval has a corresponding gradual decrease from 3600 seconds to 2900 seconds (approximately).

The user's consumption rate then has another sharp increase, and the threshold usage limit of 2 GB is met. At this point the user's consumption is immediately restricted, so that no further (or at least less) data can be downloaded by the user, for instance by restricting the bandwidth available to them. Since the threshold has been reached, the user need not be monitored further, and so the Acct_Interval reduces to the minimum accounting interval (FIG. 4) . . . . In other words, FIG. 4 shows that once the user's consumption gets very close to the threshold, the Acct_Interval reduces to the minimum accounting interval and when the threshold is hit this serves as a trigger to throttle the bit rate available to the user. Therefore only a very small number of accounting records are sent at the minimum accounting interval (e.g. 1 or 2).

Since the mechanism is not real-time, the threshold may be detected with an extra volume error that can be as high as Max_bitrate*Min_Reporting_Interval. This can occur when the user initiates a data session and the Volume_usage is very close to the Threshold. This problem can be minimised by reducing the Min_reporting_interval at the expense of increasing the load on the interface.

In this regard, the simulation shows that this embodiment of the invention is able to dynamically change the accounting interval as the cumulative volume usage approaches the threshold.

The examples that have been described are to be taken as illustrative of the invention and not limiting. For example, the arrangement of FIG. 1 is not to be taken as the exact configuration required to implement the embodiments of the invention, as various changes may be made to the architecture by 3GPP.

The embodiments described have been in relation to enforcing a fair usage policy, although other applications of the invention are possible, such as monitoring a user's usage in terms of cost in order to prevent bill shock. In this situation, once a threshold has been reached, a restriction can be placed on the user's usage by suspending or ceasing the user's access to data network resources. The user can then be notified that the threshold has been met. The user may then be prevented from downloading further data, or have restricted network access, until they issue a confirmation that they are happy to incur further costs, for instance. Alternatively the network provider may issue a continuation confirmation, for example, after the user has made an additional service payment.

The term "data" as used throughout this specification is to be interpreted broadly and is considered to encompass information in any form, particularly any representation suitable for transmission across a mobile communications network, and most particularly digital data. The content of the data is also to be interpreted broadly and is considered to encompass, web pages, user information, network information, text, pictures, videos, voice and sounds.

The invention claimed is:

1. In a telecommunications network including a gateway network element in communication with an accounting system and a user device, a method of controlling a data consumption rate of the user device including:
   transmitting a sequence of commands from a first control system node to a second control system node, each of the commands including usage information relating to data usage associated with the user device, the usage information being received from the gateway network element;
   in response to at least one of said commands, transmitting a corresponding reply message from the second control system node to the first control system node, each reply message including control information for controlling the transmission of the subsequent commands according to a variable time interval; and
   the second control system node using the data usage information within at least one of the received commands to control the data consumption rate of the user device.

2. The method of claim 1, further including dynamically determining the variable time interval applied to the transmission of subsequent commands.

3. The method of claim 2 wherein the variable time interval is determined dynamically based upon a volumetric data consumption, calculated from the data consumption rate of the user device, relative to a predefined volumetric data consumption threshold.

4. The method of claim 2 wherein the variable time interval is determined dynamically such that the frequency of the commands increases as the measured cumulative data consumption parameter approaches a data consumption threshold.

5. The method of claim 1, wherein the variable time interval is determined according to the following formula:

$$\text{Acct\_interval} = \text{Maximum}(((\text{Threshold} - \text{Volume\_usage}) / \text{Max\_bitrate} - \text{Safeguard}), \text{Min\_reporting\_interval})$$

where:
Acct_interval is the time interval;
Threshold is a data volume limit set for the user device;

Volume_usage is the cumulative data volume consumption of the user device in near real time;

Max_bitrate is the maximum bit rate of the data by the user device;

Safeguard is a set predetermined value; and

Min_reporting_interval is a minimum allowed time interval.

6. The method of claim 1, wherein the data consumption of the user device is controlled by restricting the data consumption of the device once the data usage of the device meets a data usage threshold.

7. The method of claim 1, wherein each command is a DIAMETER protocol Accounting Request (ACR) command and each reply message is a DIAMETER protocol Accounting Answer (ACA) message.

8. A control system configured for use in a telecommunications network, the control system including a first node and a second node:

the first node being configured to transmit a sequence of commands to a second node, each of the commands including usage information relating to data usage associated with a user device;

the second node being configured to transmit corresponding reply messages to the first node in response to at least one of said commands, each reply message including control information;

the second node further including a controller configured to use the control information to control the transmission of the subsequent commands according to a variable time interval; and the second node using the data usage information within at least one of the received commands to control the data consumption rate of the user device.

9. The system of claim 8 wherein the controller is further configured to dynamically determine the variable time interval applied to the transmission of subsequent commands.

10. The system of claim 9 wherein the controller is further configured to determine the variable time interval dynamically based upon a volumetric data consumption, calculated from the data consumption rate of the user device, relative to a predefined volumetric data consumption threshold.

11. The system of claim 9 wherein the controller is configured to determine the variable time interval dynamically such that the frequency of the commands increases as the measured cumulative data consumption parameter approaches a data consumption threshold.

12. The system of claim 8, wherein the time interval periodicity is determined according to the following formula:

$$Acct\_interval = Maximum(((Threshold-Volume\_usage)/Max\_bitrate-Safeguard), Min\_reporting\_interval)$$

where:

Acct_interval is the time interval;

Threshold is a data volume limit set for the user device;

Volume_usage is the cumulative data volume consumption of the user device in near real time;

Max_bitrate is the maximum bit rate of the data by the user device;

Safeguard is a set predetermined value; and

Min_reporting_interval is a minimum allowed time interval.

13. The system of claim 8, wherein the second node is configured to control the data consumption of the user device by restricting the data consumption of the device once the data usage of the device meets a data usage threshold.

14. The system of claim 8, wherein the control system conforms to a 3GPP Policy Charging Control Architecture.

15. The system of claim 8, wherein the first node is a PCEF (Policy and Charging Enforcement Function) and the second node is a PCRF (Policy and Charging Rule Function).

16. The system of claim 8, wherein each command is a DIAMETER protocol Accounting Request (ACR) command and each reply message is a DIAMETER protocol Accounting Answer (ACA) message.

17. First and second telecommunications network accounting system nodes configured to perform the method according to claim 1.

* * * * *